B. C. DILL.
DRIVING MECHANISM FOR GRAIN BINDERS AND HARVESTERS.
APPLICATION FILED JULY 8, 1918.
1,306,806.
Patented June 17, 1919.
2 SHEETS—SHEET 1.
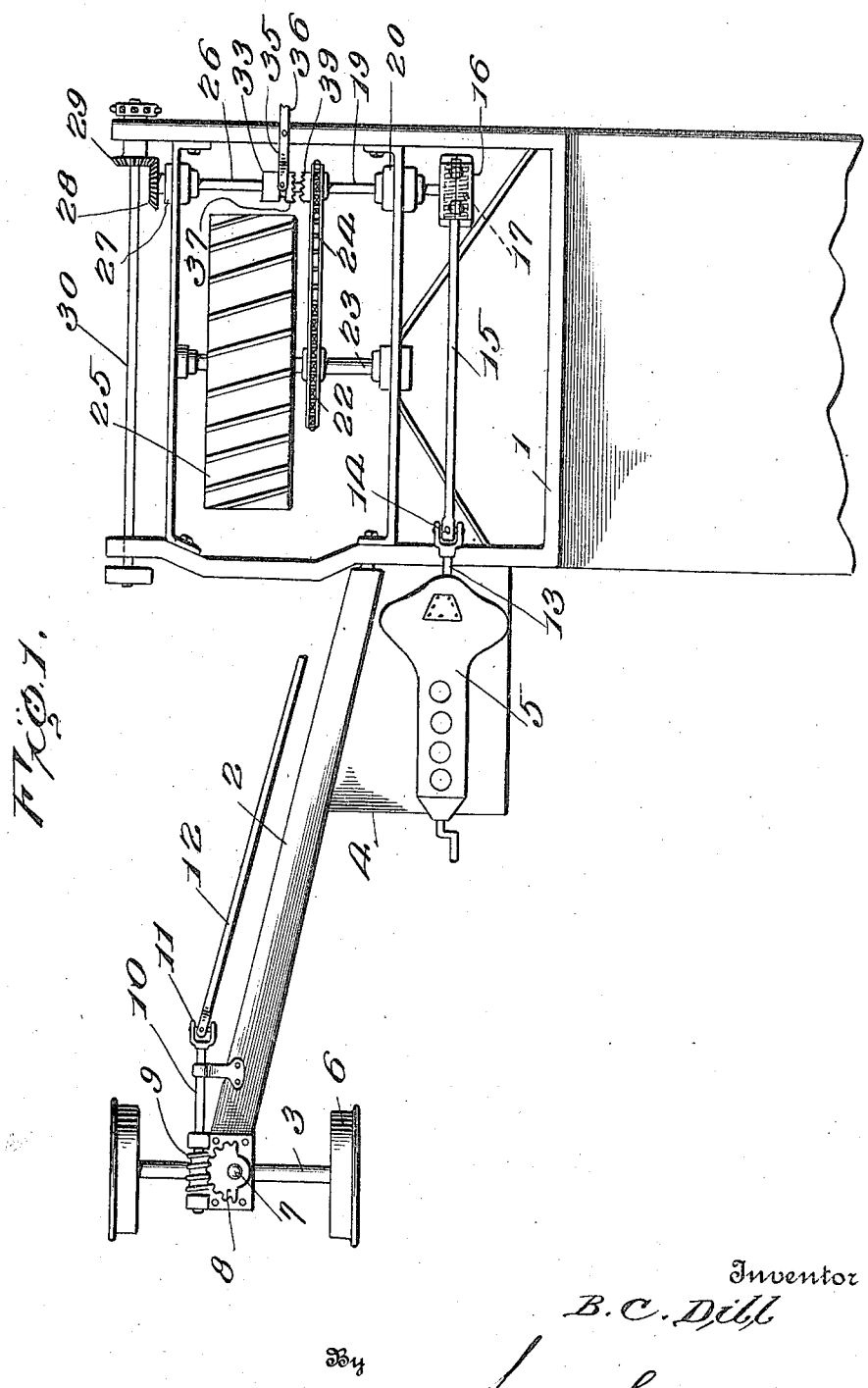
Inventor
B. C. Dill
By Lacey & Lacey, Attorneys

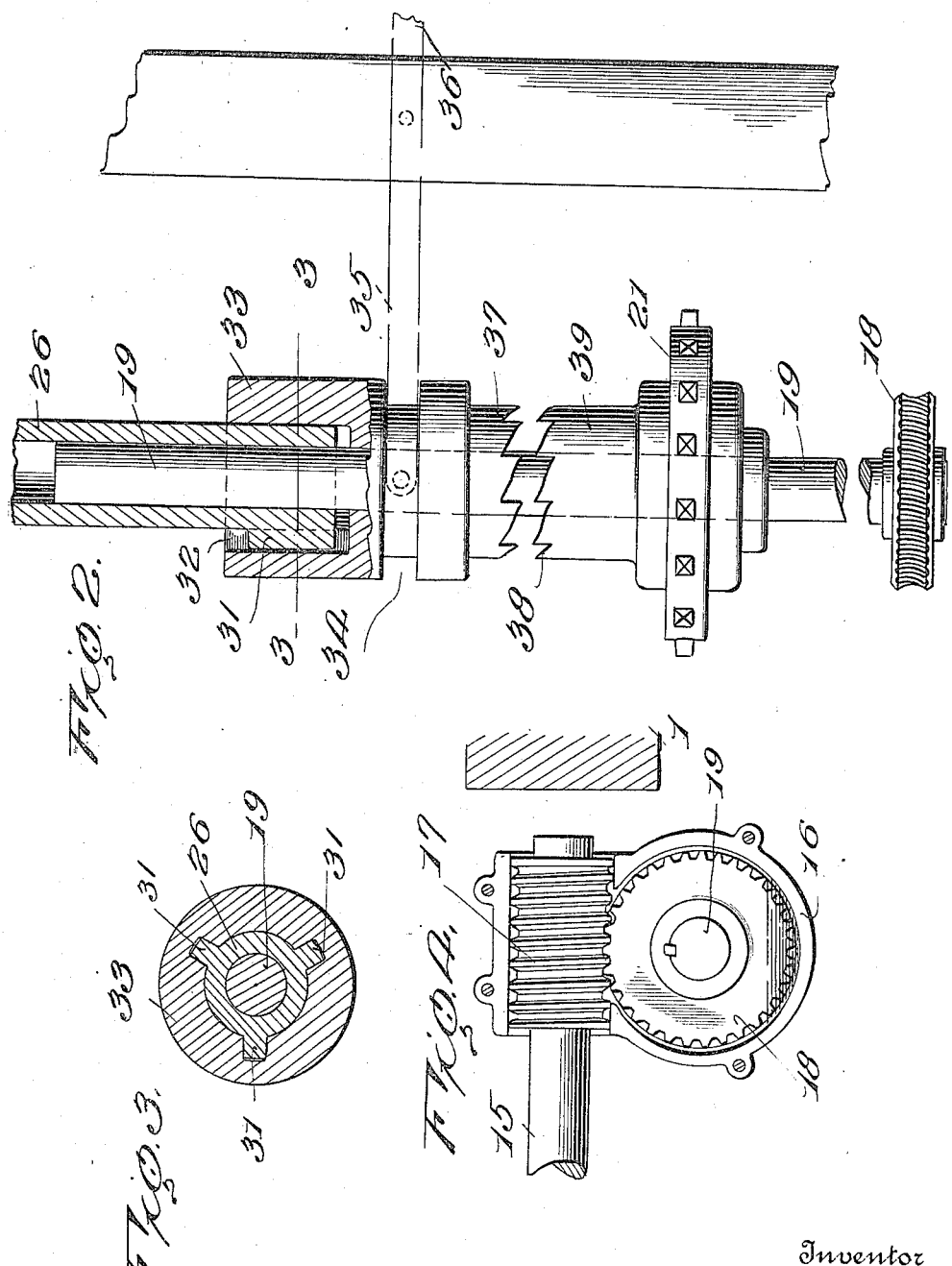

UNITED STATES PATENT OFFICE.

BERT CLARENCE DILL, OF SARGENT COUNTY, NORTH DAKOTA.

DRIVING MECHANISM FOR GRAIN BINDERS AND HARVESTERS.

1,306,806.  Specification of Letters Patent. Patented June 17, 1919.

Application filed July 8, 1918. Serial No. 243,817.

*To all whom it may concern:*

Be it known that I, BERT C. DILL, a citizen of the United States, residing in the county of Sargent and State of North Dakota, have invented certain new and useful Improvements in Driving Mechanism for Grain Binders and Harvesters, of which the following is a specification.

The object of this invention is to provide simple and efficient mechanism whereby the binding and tying mechanism of a harvesting machine may be driven from a motor mounted upon the frame of the machine which also serves to propel the machine. A further object of the invention is to provide means for readily steering the machine as it travels over a field.

In the accompanying drawings which illustrate the invention,

Figure 1 is a plan view of so much of a grain binding and harvesting machine as is necessary to show the application of the invention;

Fig. 2 is an enlarged detail view of the clutch mechanism, partly in plan view and partly in horizontal section;

Fig. 3 is a detail section on the line 3—3 of Fig. 2;

Fig. 4 is a detail view of a portion of the gearing.

The frame 1 of the machine may be of the usual or any preferred construction and from the front side thereof, near one end of the same, a tongue 2 extends forwardly, a steering truck 3 being mounted in the front end of the tongue, as shown and as will be readily understood. A platform 4 is secured to the front side of the frame 1 and to the side of the tongue 2 and upon the said platform I mount an internal combustion engine, shown conventionally at 5. The steering truck 3 consists of a pair of wheels 6 mounted upon the ends of an axle from which rises a pivot 7 which passes through and above the tongue 2 and has a segmental gear 8 secured on its upper end. Meshing with said segmental gear is a worm 9 on the front end of a shaft 10 which is mounted in suitable bearings upon the tongue and connected by a universal joint 11 with a steering rod 12 which extends rearwardly to a point over the platform 4 where it may be easily manipulated by the operator. The rear end of this steering rod may be equipped with any convenient form of steering wheel or handle and it is to be understood that the operator's seat, together with the means for controlling the speed of the engine and the direction of travel of the machine, are mounted upon this platform and may be of any desired form, but they are not illustrated inasmuch as they form no part of my present invention.

The engine shaft 13 is connected by a universal joint 14 with a driving shaft 15 having its rear end mounted in a suitable gear case 16 and equipped with a worm 17 which meshes with a worm wheel 18 on the inner end of the transmission shaft 19. The said transmission shaft is mounted in roller bearings 20 and has secured upon it a sprocket pinion 21 around which, and a sprocket wheel 22 on the axle 23, is trained a sprocket chain 24. The axle 23 is mounted in suitable bearings upon the main frame and carries a traction wheel 25 which is located in the same longitudinal plane as the front end of the tongue 2 so that the steering truck will travel in the direct line of the applied power for propelling the machine and the traction wheel and the entire machine will respond quickly to the change in position of the steering truck. The outer end of the transmission shaft 19 is supported in a hollow shaft 26, the latter being supported in roller bearings 27 on the main frame and equipped at its outer end with a beveled pinion 28 meshing with a similar pinion 29 on the shaft 30 from which power is transmitted in the usual manner to the cutting, binding and tying mechanisms. The inner end of the hollow shaft 26 is provided with one or more short longitudinal ribs or keys 31 which are adapted to engage longitudinal grooves 32 in the inner surface of a clutch sleeve 33 which is slidably mounted upon the said hollow shaft and upon the transmission shaft 19, as shown and as will be readily understood. This clutch sleeve is provided with an annular groove 34 which is engaged by studs on the forked end 35 of a shifting lever 36 which may be manipulated through cables or similar devices extending over the main frame to a point near the operator's seat, the shifting lever being pivotally mounted upon the main frame in rear of the transmission shaft and clutch sleeve. The inner end of the clutch sleeve 33 is constructed with teeth 37 adapted to engage mating teeth 38 on the outer end of a clutch hub 39 extending from the sprocket 21 so that if the sleeve be shifted inwardly the teeth 37, 38 will be brought into engagement and the sleeve thereby locked to the transmission shaft 19 so as to rotate therewith and transmit the rotation to the hollow shaft 26.

The operation is thought to be evident. The engine acts directly upon the driving shaft 15 so as to rotate the same and the motion of this shaft is transmitted through the worm gearing 17 and 18 to the transmission shaft 19. The motion of the said shaft 19 is transmitted through the sprocket pinion 21, chain 24, and sprocket gear 22 to the axle 23 so that the traction wheel 25 will be rotated and the machine caused to travel over the field. It will be understood, of course, that the engine will be provided with change speed and reversing gearing so that the machine may be driven forwardly or backwardly and may be caused to travel forwardly at a high or low speed as the exigencies of its operation may demand. When the machine is traveling without being required to do any work, the clutch sleeve is held away from the clutch hub so that the transmission shaft will rotate within the hollow shaft and the clutch sleeve without imparting motion to the same, but when it is desired to have the cutting, tying, and binding mechanisms operate, the sleeve is shifted into engagement with the clutch hub and the rotation of the transmission shaft will then be transmitted to the clutch sleeve and through the same to the hollow shaft. My mechanism is composed of very few parts which are simple in their construction and are compactly arranged so that the improvements may be readily applied to any harvester now in use and may be also incorporated in machines subsequently built. It is to be noted that the tongue 2 is disposed obliquely so that side draft is reduced while utilizing frame connections of the type now in use. The gear case 16 incloses the worm gear so that the same may run in oil and will be protected against an accumulation of dirt. The case is supported by the shaft 19 which serves as a pivot therefor so that the driving shaft may accommodate itself to the tilting of the machine.

Having thus described my invention, what is claimed as new is:

1. The combination of a supporting frame, a traction wheel mounted thereon, a shaft mounted upon the frame, means for rotating the shaft, a hollow shaft mounted upon the frame in axial alinement with the first mentioned shaft and receiving and supporting the outer end of the same, gearing to be driven by the hollow shaft, and means for operatively connecting the hollow shaft with the first-mentioned shaft to rotate therewith.

2. The combination of a main frame, a shaft mounted upon the frame, means for rotating said shaft, a clutch hub fixed on said shaft, a hollow shaft mounted upon the frame in axial alinement with the first mentioned shaft and having its inner end provided with longitudinal ribs and receiving and supporting the outer end of the transmission shaft, gearing to be driven by the hollow shaft, a clutch sleeve slidably mounted upon the first mentioned shaft and adapted to engage the clutch hub, the outer end of the clutch sleeve being provided with internal longitudinal grooves to engage the ribs on the hollow shaft, and means for shifting said clutch sleeve.

In testimony whereof I affix my signature.

BERT CLARENCE DILL. [L. S.]

Copies of this patent may be obtained for five cents each, by addressing the "Commissioner of Patents, Washington, D. C."